Figure 1:
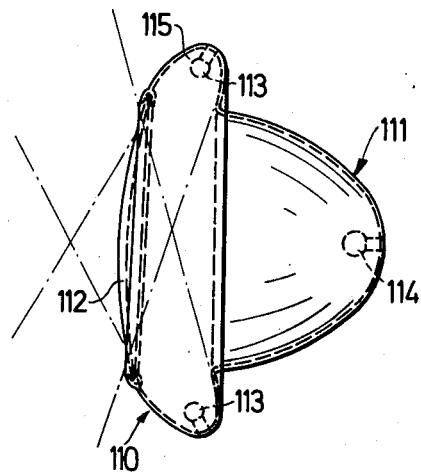

United States Patent [19]
Plewka

[11] 3,759,084
[45] Sept. 18, 1973

[54] HEADLAMPS OF VEHICLES

[76] Inventor: Anna B. Plewka, Hauptstrasse 12, Kettwig/Ruhr, Germany

[22] Filed: Aug. 27, 1970

[21] Appl. No.: 67,552

[30] Foreign Application Priority Data
Aug. 28, 1969 Germany............P 19 43 640.9

[52] U.S. Cl.............................. 240/7.1 R
[51] Int. Cl............................... B60q 1/18
[58] Field of Search................ 240/7.1 R, 41 R

[56] References Cited
UNITED STATES PATENTS
1,655,399  1/1928  Wagner................... 240/7.1 R
1,262,394  4/1918  Schickerling............. 240/7.1 R Primary Examiner—Richard C. Queisser
Assistant Examiner—Denis E. Corr
Attorney—Watson, Cole, Grindle & Watson

[57] ABSTRACT

Headlights particularly for motor vehicles in which a supplemental light or lights is provided around the headlight and adjacent thereto so that the beams of light therefrom will be projected in directions other than the rays which are projected from the main headlight.

5 Claims, 10 Drawing Figures

Patented Sept. 18, 1973

3,759,084

2 Sheets-Sheet 1

Inventor
Anna B. Plewka

Watson, Cole, Grindle & Watson
Attorneys

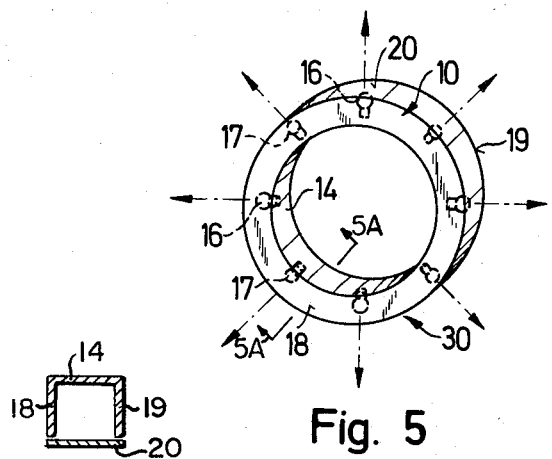
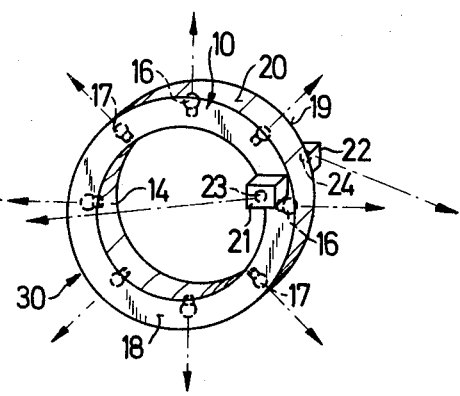
Fig. 5A    Fig. 5    Fig. 6
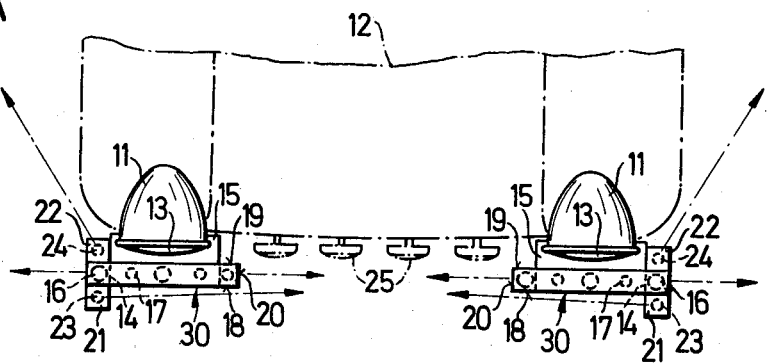
Fig. 7
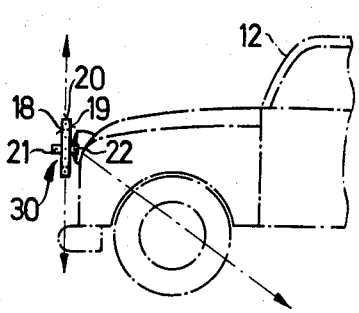
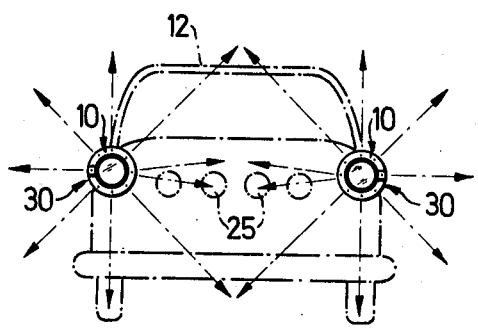
Fig. 8    Fig. 9

HEADLAMPS OF VEHICLES

This invention relates to a device for reducing the dazzling effect of vehicle headlamps, in particular of motor car headlamps and lights, and the device comprises a supplemental lamp illuminating the neighborhood of the headlamp, said supplemental lamp being designed and disposed in such a manner that it does not project light directly in the moving direction of the vehicle.

It is already known to reduce the dazzling effect of headlights by illumination of the switched-on headlight and the neighborhood thereof, a supplemental headlamp being provided for this purpose on the roof of a vehicle, the beams of the supplemental lamp illuminating the front portion of the vehicle and the headlamps mounted thereon. The beams are directed obliquely in downward direction so that they illuminate the lateral regions, too, however, not being projected in parallel with respect to the direction of movement.

Further it is known to provide as portions of a dazzling free illumination system at the front face of a motor car, projecting lamps, the light beams of which being directed rearwardly with respect to the movement of the vehicle, to the front face of the latter and thus to the headlamps thereof, too, a rearwardly pointing concave reflector comprising a light source to which a further reflector of approximately conical shape with concave face is directed, thus reflecting the light back to the vehicle which, however, is immediately also illuminated by the light source. This system is said to provide a better light distribution for illuminating the front of the car due to increased light efficiency. Further in, two indentations at the front portion of the car, supplemental headlamps are provided whose light beams are directed downwardly and forwardly to the street. When switching on said illuminating and supplemental lamps the very headlamps of the car are preferably to be switched off or to be dimmed so that the drivers of cars moving in opposite direction may have sufficient sight for passing without being disturbed by dazzling light.

A draw-back of the system hitherto proposed is the separation between the headlights and the supplemental lights for the reason that the supplemental lights illuminate the headlights from a more or less greater distance so that the light of the supplemental lamps will not be very effective to illuminate the immediate surroundings of the headlamps in a concentrated manner.

It is an object of the present invention to improve the devices of the aforementioned type in view of design, efficiency and traffic safety so that the dazzling of the headlights may be reduced or even eliminated without interfering with the light efficiency of the headlights themselves.

The invention provides for this purpose a device in which the supplemental lamp forms a subassembly together with the headlamp. Accordingly by the invention the necessity ceases to provide an additional lamp for example on the vehicle roof or of illuminating lamps so that the lighting system of the vehicle in its entirety will be simplified. The neighborhood of the headlamps being illuminated by the supplemental lamp of the invention, the dazzling effect for a vehicle moving in opposite direction will be eliminated or at least considerably reduced. The driver of a vehicle in opposite direction thus does not only see two lightpoints without dazzling effect but an extended lighting surface at the front face of the car, the headlamps not pointing therefrom. Due to this reduced dazzling effect of the headlamps at least on highways the usual switching from the distance headlamp to dimmed headlamp in case of counter-traffic could be dispensed with.

Figure 2:
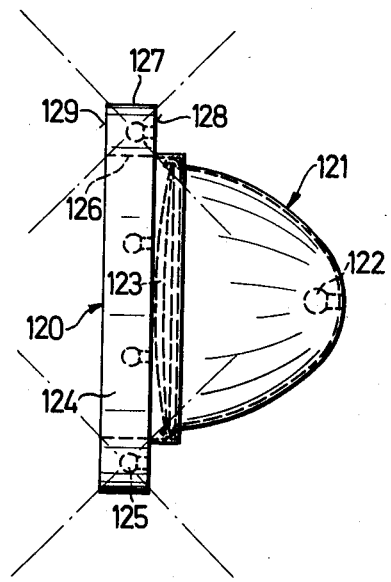
Figure 3:
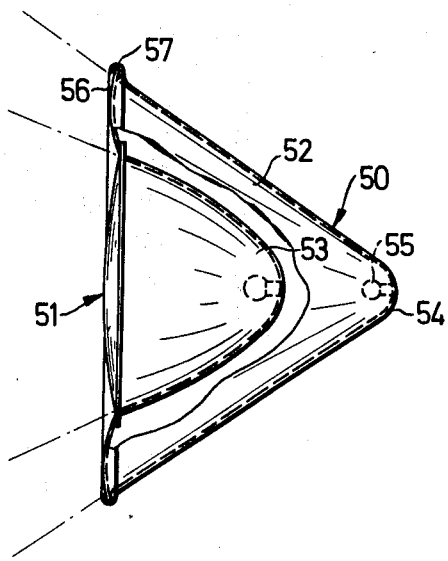
Figure 4:
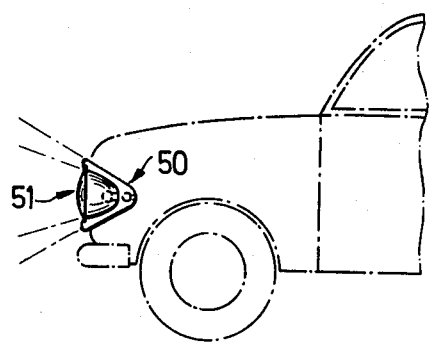

Further objects of the invention will be apparent from the following description when considered in connection with the accompanying drawings in which;

FIGS. 1 to 3 are side views showing schematically an embodiment of a headlamp combined with the supplemental lamp to form a subassembly in which the surroundings of the headlamp itself are illuminated, FIG. 4 is a diagrammatic view of a portion of a motor car comprising a headlamp as shown in FIG. 3, FIGS. 5 and 6 are front views showing modifications of the embodiment illustrated in FIG. 2, FIG. 5A is a sectional view of the casing taken along line 5A—5A of FIG. 5 and FIGS. 7 to 9 are plan, side and front views respectively to show schematically the mounting of the improved headlamp subassembly of FIG. 6.

Referring to FIG. 1, the headlamp 111 comprises a housing whose rear portion forms a reflector in which a light source 114 is provided. At the front face a front window 112 is mounted in the usual manner. The housing further comprises an annular bulge 115 forming portion of the supplemental lamp 110 and housing the light sources 113 thereof. The bulge 115 is inwardly opened and forms a reflector for the light sources 113 so that their bright light radially and crosswisely is directed in the neighborhood, that is, the dazzling zone of headlamp 111, and to the lateral portions with respect to the car. This subassembly may be mounted completely in the car body including the housing bulge so that only the front window 112 will be seen. It is, however, also possible to combine the headlamp already present on a vehicle with a supplemental lamp.

Referring now to FIG. 2, the headlamp 121 comprises in a similar manner, a housing forming a reflector for the light source 122 and further a front window 123. The supplemental lamp 120 comprises an annular casing 124 having a square section shape, the edges of which being about seven centimeters, the casing 124 being mounted in spaced relation about the headlamp 121. The casing 124 is connected to the headlamp 121 by means of a mounting ring, however, it may also be combined with the headlamp to a subassembly later on. The inner and outer ring wall 126 and 127 respectively of the non-reflecting casing 124 consist of transparent material to permit the passing of light beams of at least three light sources 125. The rear wall 128, however, consists of a material being opaque and the light sources are mounted thereon. The front wall 129, however, is made of a material which could be defined as semi-transparent; and for this purpose a transparent material can be colored glass, frosted glass or opal glass. The light emitting from the annular casing radiates substantially in radial direction opposite the headlamp outwardly and simultaneously radially inwardly to the headlamp and that preferably in front of the light emitting plane of the headlamp. The light, however, is only partly transmitted through the front wall.

In order to illuminate the neighborhood of the headlamp and the dazzling beam crown thereof, the supplemental lamp according to the invention need not necessarily be disposed in front of the light emitting plane of the headlamp. As shown in FIG. 3, the supplemental lamp 50 is provided behind the headlamp 51 and comprises a casing 52 made of non-reflecting material and having a form which is equally spaced from the headlamp reflector 53, the distance between the casing and the headlamp housing being at least five centimeters. The casing 52 opens in forward direction. In the rear end portion 54 of the casing 52 a forwardly directed light source 55 is provided radiating around the headlamp 51 and being spaced about 20 centimeters from the dazzling zone. The light emits around the headlamp front window in an oblique direction. In order to permit an increased light emission, the casing 52 is widened in forward direction. In this embodiment of the invention the headlamp 51 is mounted in the casing 52 of the supplemental lamp 50 by means of screws or by means of metal strips extending from the front face rearwardly. The opening of the casing 52 is provided with a releasable annular window 56 made of transparent glass or plastic material, the outer edge of said window being secured to the subassembly by means of a metal ring 57 surrounding the window. The supplemental lamp casing 52 and the headlamp housing 53 may, however, also comprise one single front window of appropriate dimension.

The supplemental lamps of all embodiments are electrically connected in such a manner that they are switched on compulsory together with the dimmed light or distance light of the headlamp. There is no need to electrically connect the supplemental lamp to the parking light.

Referring now to FIGS. 5 to 9, it is to be noted that presently many motor cars are provided with extremely strong headlamps and sometimes multiple additional lamps so that the means described above may sometimes be insufficient to provide the dazzling reduction.

The supplemental lamp 30 shown in FIG. 5, comprises an annular casing 10, the shape and dimension of the casing being adapted to shape to and dimension the headlamp 11, FIG. 7, of a car 12 to which the device is to be mounted. The casing 10 has a substantially square section shape with edges of about 7 centimeters. The casing 10 may surround the light emitting window 13 of the headlamp 11 with or without a space being provided therebetween; the casing may further be mounted in front of the headlamp window as shown in FIGS. 7 and 8 or may be disposed rearwardly with respect to the headlamp window. Finally, the casing 10 may be a separate part or may form an integral portion of the headlamp.

The casing 10 comprises a tubular inner ring wall 14 being opaque and serving as the carrier for the other portions of the casing. The inner ring wall 14 may be made of plastic or preferably of metal. The inner face of the wall 14 may be provided with a bracket 15 for mounting the casing 10 at the headlamp 11. The outer face of the inner ring wall 14 carries the electrical installation for preferably at least four strong light sources 16 and further four less strong light sources 17 being alternately disposed with the strong sources 16 and equally spaced therefrom. Suitably the strong light sources are provided in horizontal and vertical diameter line of the casing 10 while the weaker light sources 17 are mounted therebetween.

Further the outer face of the tubular inner ring will 14 is designed to form a reflector for all light sources 16 and 17 for example by providing a U-shaped section. Alternatively, however, each light source may be provided with a sperical reflector individually. Thus the light beams of light sources 16, 17 are radially outwardly directed opposite the headlamp 11.

The casing 10 further comprises an annular front wall 18 and a rear wall 19 of the same dimension which both are semi-transparent and may thus be unable to dazzle; for this purpose walls 18, 19 may be made of opal glass, colored glass, milky glass or plastic material.

The casing 10 finally comprises an outer ring wall 20 made of transparent material, the reflected light beams passing substantially therethrough.

The inner wall 14, the outer wall 20, front wall 18, and rear wall 19 of the casing 10 may be mounted by means of straight or curved bars and the outer wall 20 or the front wall 18 may be released from the casing 10. Alternatively the casing 10 may be made of two parts only so that but the front wall or the outer ring wall are to be released for opening the casing. It is also possible to have the outer ring wall releasable and the remaining portions with a U-shaped section (see FIG. 5A) split along a diametral plane.

Also it is possible to have the rear wall 19 made of metal so that it can function as a carrier for the electric installation. The inner ring wall will thus just be provided for reflection of the light but will not serve anymore as an installation carrier.

The supplemental lamp may be individually designed and dimensioned to be combined with headlamps of different type.

In order to increase the dazzling reduction, the embodiment as shown in FIGS. 6 to 9 comprises each chambers 21 and 22 disposed respectively in front and rearward of the casing 10 on the front wall 18 and the rear wall 19 respectively. The chambers 21 and 22 are arranged within the horizontal diametral plane through the casing 10 at the respectively outer end. The chambers 21 and 22 are made of transparent material with the exception of the forward pointing wall which is semi-transparent. The section of each chamber 21 and 22 is about the same as the section of the casing 10. Each chamber 21 and 22 houses a light source 23 and 24 and a reflector, the latter being disposed in the front chamber 21 in such a manner that the light of light sources 23 crossing each other is reflected substantially transverse with respect to the vehicle 12 and passing by the headlamp 11 to the other front chamber 21 and further to the street edges. In order to reduce the dazzling light rays of other drivers, the light of the front chamber 21 is reflected under a small angle obliquely downwardly and rearwardly. The reflectors disposed in the rearward chamber 22 are adjusted for the same purpose in such a manner that the light of the light sources 24 is reflected to the backward street edges obliquely rearwardly and downwardly, simultaneously an illumination of the lateral and an increased illumination of the front portions of the vehicle body being achieved. A suitable face of the chambers is provided for access. The casing together with the chambers may be an integral member, however, the casing may be manufactured also without said chambers. Depending upon the type of the vehicle it may be suitable to provide such chambers also at the upper end of the vertical diametral plane as indicated in FIG. 8 or/and to provide an additional chamber at the inner horizontal diametral plane as indicated in FIG. 7. The chamber 10 with the additional chambers 21, 22 need not necessarily be disposed as indicated in FIGS. 7 and 8; the casing 10 may as well be disposed so that its front wall will be flush with the window of the headlamp as indicated in FIG. 1.

It will be understood that the casing 10 together with chambers 20, 21 and 22 and even with further chambers suitably disposed may be integrally formed of plastic material for example by injection moulding. The dash dotted lines in FIGS. 7, 8 and 9 indicate the respective direction of the light beams or rays.

It will be appreciated that the reflector means and the additional chambers with additional light sources may as well be provided as of the embodiments of FIGS. 1 and 3.

I claim:

1. Device for reducing the dazzling effect of vehicle headlamps, especially for motor vehicles, comprising a supplemental lamp having an annular casing surrounding the vehicle headlamp, said casing having inner and outer ring walls, a rear wall and a front wall, said outer ring wall being light transparent, said inner ring wall being light reflecting in an outward direction, the light transmission qualities of said rear wall and said front wall ranging from translucent to opaque, and supplemental light sources being housed within said casing.

2. The device according to claim 14 further including chambers located respectively on said rear and front walls of said casing, additional light sources being located within said chambers.

3. The device according to claim 1 wherein at least four of said supplemental light sources are housed within said casing.

4. The device according to claim 1 wherein eight of said supplemental light sources are equally spaced within said casing, two of said supplemental light sources being in vertical alignment, two more of said supplemental light sources being located in a horizontal plane, and the remaining ones of said supplemental light sources being weaker than the other four.

5. The device according to claim 1 wherein said inner ring wall has a U-shaped section and comprises two semi-circular ring halves split along a diametral plane thereof.

* * * * *